United States Patent [19]

Reisinger et al.

[11] 4,032,709

[45] June 28, 1977

[54] CIRCUIT ARRANGEMENT FOR LENGTHENING A STOP ELEMENT AT THE RECEIVER IN A CHARACTER-FRAME-GOVERNED TIME DIVISION MULTIPLEX DATA TRANSMISSION SYSTEM

[75] Inventors: Konrad Reisinger, Zorneding; Ludwig Hölzl, Sauerlach, both of Germany

[73] Assignee: Siemens Aktiengesellschaft, Munich, Germany

[22] Filed: Mar. 19, 1976

[21] Appl. No.: 668,520

[30] Foreign Application Priority Data

Mar. 20, 1975 Germany .......................... 2512303

[52] U.S. Cl. ................................................ 178/50
[51] Int. Cl.² ........................................ H04L 5/00
[58] Field of Search ............... 178/50, 53, 53.1 R, 178/53.1 A, 69.5 R; 179/15 BA, 15 BS, 15 AF

[56] References Cited

UNITED STATES PATENTS

| 3,702,900 | 11/1972 | Stürzinger | 178/53.1 R |
| 3,970,796 | 7/1976 | Gyürki | 179/15 AF |

Primary Examiner—Thomas A. Robinson
Attorney, Agent, or Firm—Gerald L. Lett

[57] ABSTRACT

A circuit arrangement for use in a time division multiplex (t.d.m.) data transmission system for lengthening the stop elements of data signals is described. The t.d.m. signals are transmitted via a transmission link to a receiver multiplexer. The outputs of the multiplexer are, respectively, connected by channel units to data sinks. Prior to reaching the multiplexer, however, the received data signals all pass through a central stop element lengthening device which produces a timing signal which is sequentially coupled to the channel units. The channel units, in the form of bistable stages, receive these timing signals and the information portions of the data signals, and from these establish the leading and trailing edges of the bits coupled to the respective data sinks.

4 Claims, 9 Drawing Figures

CIRCUIT ARRANGEMENT FOR LENGTHENING A STOP ELEMENT AT THE RECEIVER IN A CHARACTER-FRAME-GOVERNED TIME DIVISION MULTIPLEX DATA TRANSMISSION SYSTEM

BACKGROUND OF THE INVENTION

The invention relates to apparatus for transmitting data signals on a time division multiplex (t.d.m.) basis and more particularly to a circuit arrangement for lengthening the stop element portion of a data signal at the receiving end in a character-frame-governed t.d.m. transmission of data, wherein a t.d.m. signal is transmitted across a transmission link, and at the receiving end, is conducted to a multiplexer, whose outputs are connected to channel units. Data signals are emitted via the outputs of the channel units to a plurality of data sinks.

When, within a receiving portion of a t.d.m. system, a data signal is conducted via a multiplexer to a channel unit, and thus a lengthening of a stop element in the data signal is brought about, a system of this type can be advantageous when a relatively small number of channel units and data sinks are provided. The greater the number of channel units and data sinks, the greater becomes the complexity and expense required to lengthen the stop element.

An object of the invention is to provide a means for effecting a lengthening of the stop element in character-frame-governed transmission of data, which is characterized by relatively little complexity and expense, in particular when a relatively large number of channel units and data sinks are provided.

SUMMARY OF THE INVENTION

In accordance with the invention, the foregoing and other objects are obtained in apparatus wherein the t.d.m. signal is conducted to a central stop element lengthening device in which a timing signal is produced for the operation of all the channel units. A sequence of sampling pulses is produced which occur approximately in the center of the signal components of the t.d.m. signal, and each sampling pulse is precisely assigned to one of the signal components. A first counter unit is provided which is supplied with the sampling pulses as counter pulses, and a gate emits blocking pulses when, during the duration of the sampling pulses, the t.d.m. signal is signalling a start element and a given count is reached, or exceeded, in the first counter unit. A second counter unit is also provided which is supplied with the blocking signal as counter signal, and which is reset when the predetermined count has been exceeded. A third counter unit is supplied with the sampling pulses as counter pulses, and the timing signal is produced when the counts of the second and third counter units are equal to one another.

The circuit arrangement in accordance with the invention is characterized by relatively little complexity and expense because the centrally arranged stop element lengthening device requires only one item of a number of components which would otherwise be used if a decentralized stop element lengthening would have been required for each of the channel units.

BRIEF DESCRIPTION OF THE DRAWINGS

In the following, exemplary and preferred embodiments of the invention will be described making reference to FIGS. 1 to 9, where identical components appearing in more than one figure have been provided with like references.

DETAILED DESCRIPTION OF THE PREFERRED EMBODIMENT

Figure 1:
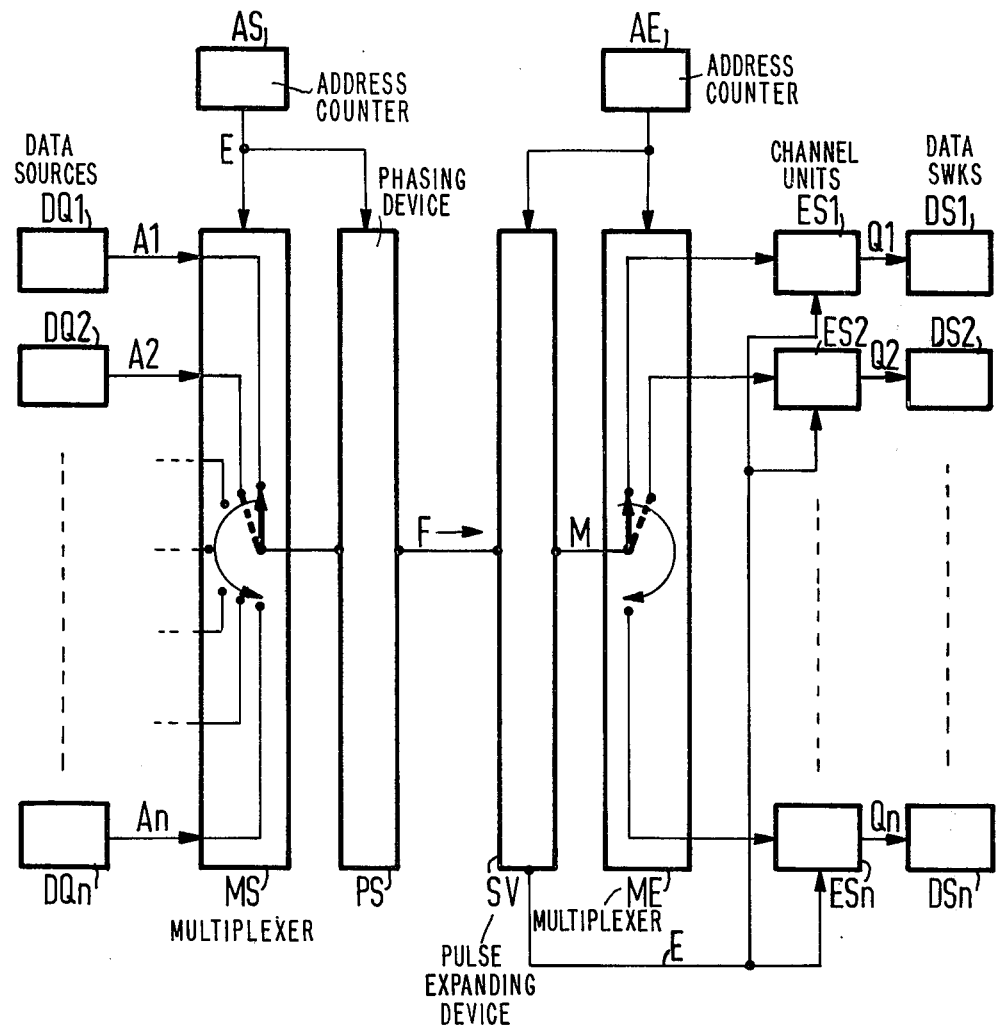
FIG. 1 is a block-schematic diagram of a t.d.m. data transmission system incorporating apparatus according to the invention.

FIG. 1 shows a t.d.m. data transmission system constructed to include the inventive apparatus. The data sources DQ1, DQ2 . . . DQ$n$ supply the items of data which are to be transmitted to a transmitting-end multiplexer MS which is controlled by a transmitting-end address counter AS. This address counter AS continuously and repetitively emits addresses one, two . . . $n$, one, two . . . $n$ corresponding to the signals A1, A2 . . . A$n$, A1, A2 . . . A$n$. When, for example, the address one is called up, the signal A1 is switched through via the input of the multiplexer MS to its output. A transmitting-end in-phasing device PS serves to bring the individual bits of the signals A1 to A$n$ into phase. This in-phasing device is fully described in commonly assigned U.S. application Ser. No. 668,521 filed Mar. 19, 1976, by the same applicants, as herein, entitled "Apparatus for the Time Division Multiplex Transmission of Binary Signals." In this way the signal F is formed for transmission across a transmission link.

At the receiving end are arranged a stop element lengthening device SV, a receiving-end multiplexer ME, a receiving-end address counter AE, channel units ES1, ES2 . . . ES$n$, and data sinks DS1, DS2 . . . DS$n$.

The data sources DQ1 to DQ$n$ can, for example, be teleprinters, teleprinter exchanges, punched tape readers, punched card readers. To simplify the illustration only three data sources have been shown, whereas in practice a hundred such data sources can be provided. At the receiving end as many data sinks DS1 to DS$n$ as data sources DQ1 to DQ$n$ are provided. The data sinks can, for example, be in the form of teleprinters, teleprinter exchanges, punched tape punches, punched card punches.

Figure 2:
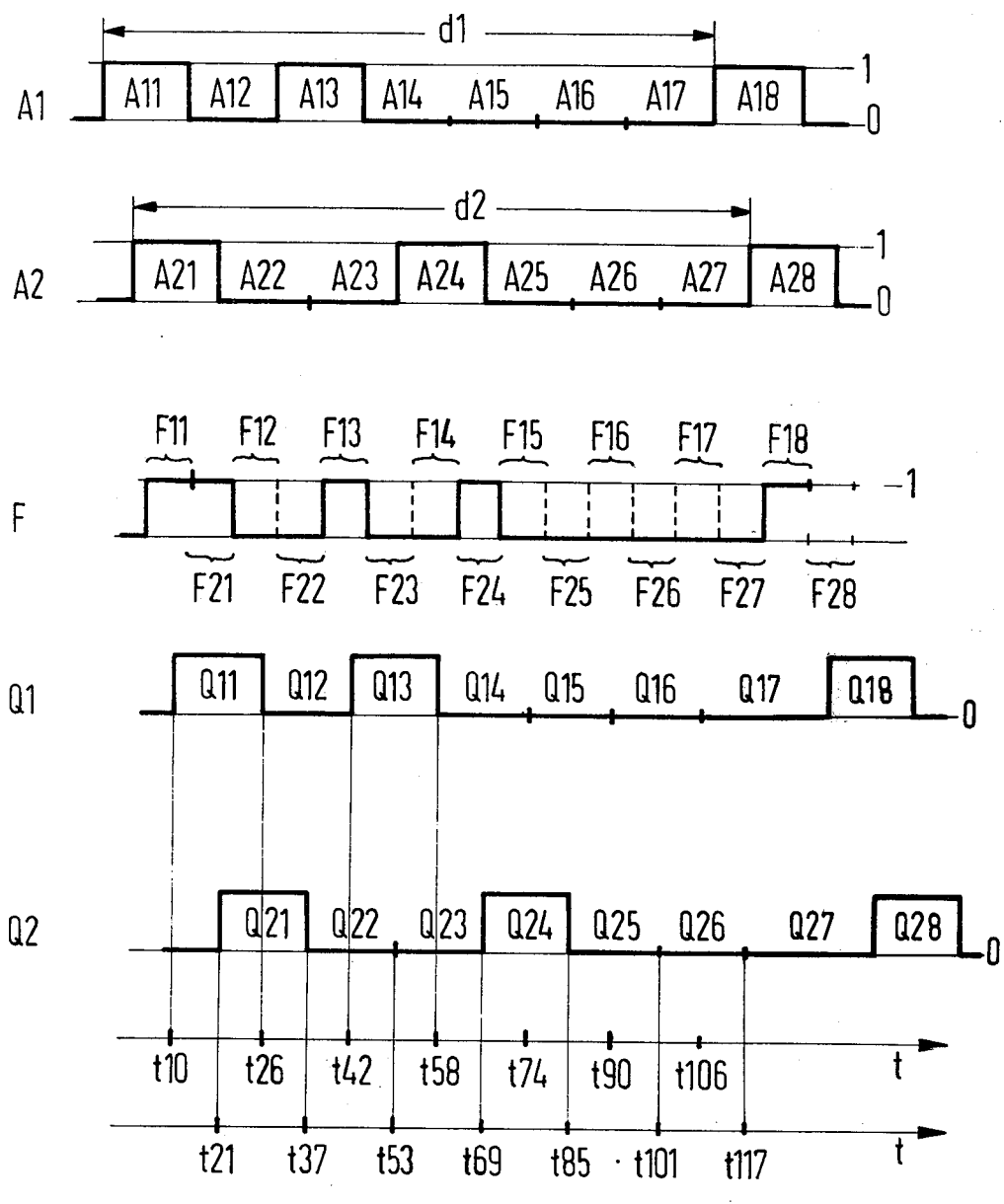
FIG. 2 is a time-waveform diagram illustrating signals which occur in the system shown in FIG. 1.

FIG. 2 illustrates a few binary signals, the bits of which are referenced 0 and 1. The data sources DQ1 and DQ2 emit signals A1 and A2. During the duration d1 a first character is signalled with the signal A1. Bit A11 is the start element, bits A12, A13, A14, A15, A16 are the information bits and bit A17 is the stop element of the first character. The first character is thus formed by the word 1010000.

During the interval d2 the signal A2 signals another character with bit A21 as start element, with bits A22, A23, A24, A25, A26 as information bits and with bit A27 as stop element. This additional character is formed by the word 1001000. Bit A28 is the start element of the next character.

If, as has been assumed here, only two data sources are provided, and only the two signals A1 and A2 are transmitted, then the signal F contains only parts of these two signals A1 and A2. The signal F is transmitted to the receiving end where the signals Q1 and Q2 are derived and conducted to the data sinks DS1 and DS2. In many cases the data sinks DS1 and DSn arranged at the receiving end can be supplied with characters whose stop elements are of the same length as the remainder of the bits. In many cases, and in particular when the data sinks are in the form of teleprinters, it is advantageous to supply these data sinks with signals having lengthened stop elements even when the signal F signals stop elements which are of the same length as the other bits. For example, the stop elements A17 and A27 of the signals A1 and A2 are of the same length as the other bits A11 to A16 and A21 to A26, whereas the stop elements Q17 and Q27 are longer than the remaining bits Q11 to Q16 and Q21 to Q26. This lengthening of the stop element is fundamentally effected with the stop element lengthening device SV, with the receiving-end multiplexer ME and with the channels units ES1 to ESn. The stop element lengthening device SV will be described in further detail making reference to FIGS. 3 to 6.

The multiplexer ME operates in known manner, in the fashion of a switch which obtains addresses from the address counter AE and which with every address assumes a specific switch position. For example, on the reception of the address one, the solid line switch position is set, and on the reception of the address two, the broken line switch position is set. The multiplexer ME is supplied at its input with the signal M and via its outputs signal components of this signal M are fed as timing signals to the channel units ES1 to ESn. The channel units are in the form of trigger stages which receive not only the signal M but also the signal E which represents the actual information. The signal components emitted from the multiplexer ME establish the leading edges and the trailing edges of the individual bits which constitute the signals Q1 to Qn.

Figure 3:
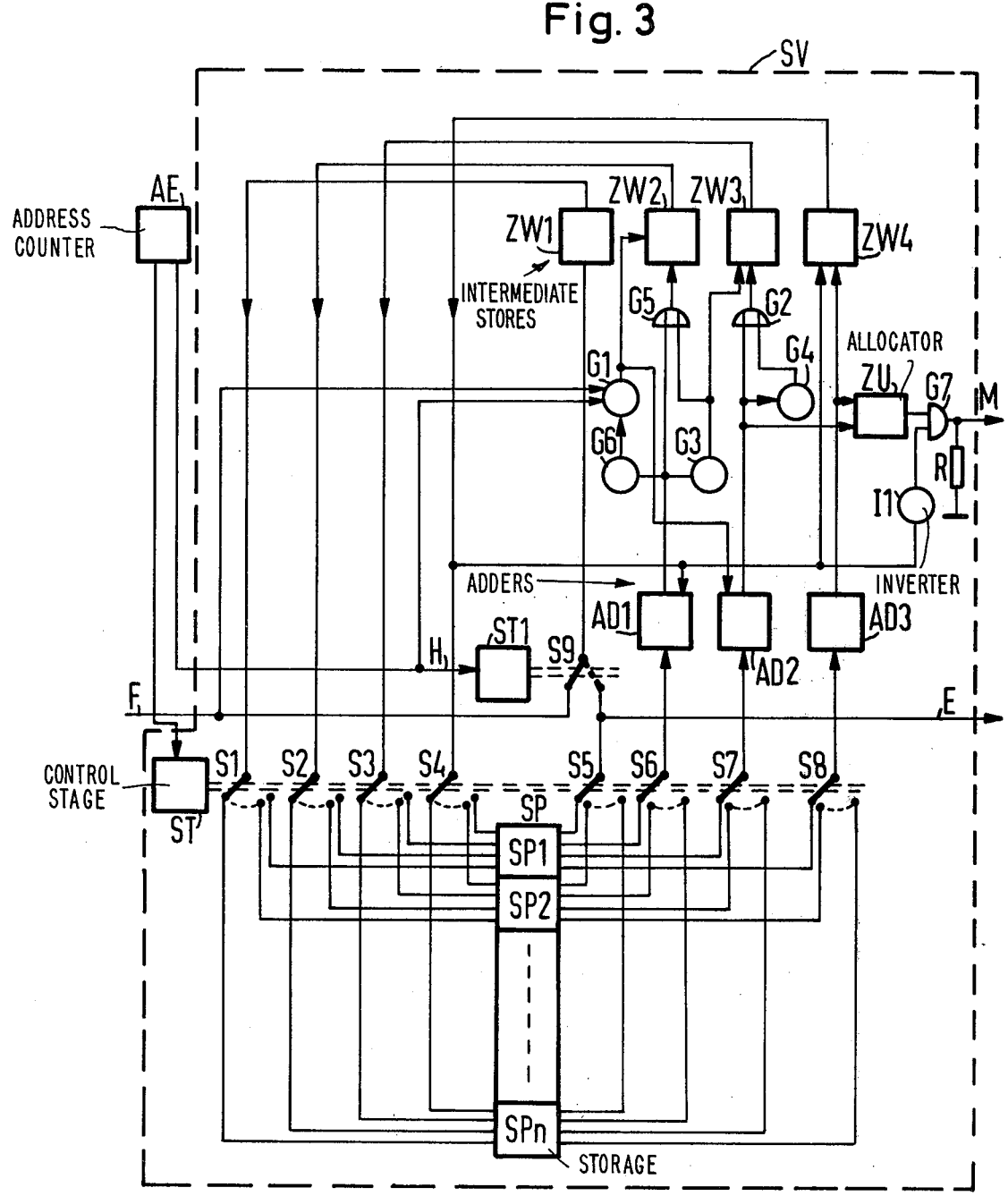
FIG. 3 is a schematic circuit diagram of the stop element lengthening device illustrated in the FIG. 1 embodiment.

FIG. 3 schematically illustrates the stop element lengthening device SV. It includes a store SP comprising a plurality of parts SP1, SP2 ... SPn, each of which are assigned to one of the data sources DQ1, DQ2 ... DQn and to one of the data sinks DS1, DS2 ... DSn. The switches S1, S2, S3, S4, S5, S6, S7, S8 each have one central contact and a total of n further contacts which are each connected to one of the store parts SP1 to SPn. The total of n switch positions are set up by means of the control stage ST. When for example the address counter AE emits the address one to the control stage ST, the switches S1 to S8 assume the solid line switch position. To simplify the drawing, only one address line has been entered from the address counter AE to the control stage ST, whereas generally a plurality of address lines are provided via which binary numbers representing the individual addresses are emitted in parallel. With these addresses the multiplexer ME is set and the control stage ST is controlled in such manner that the switches S1 to S8 advance by one switch position with each new address.

Figure 4:
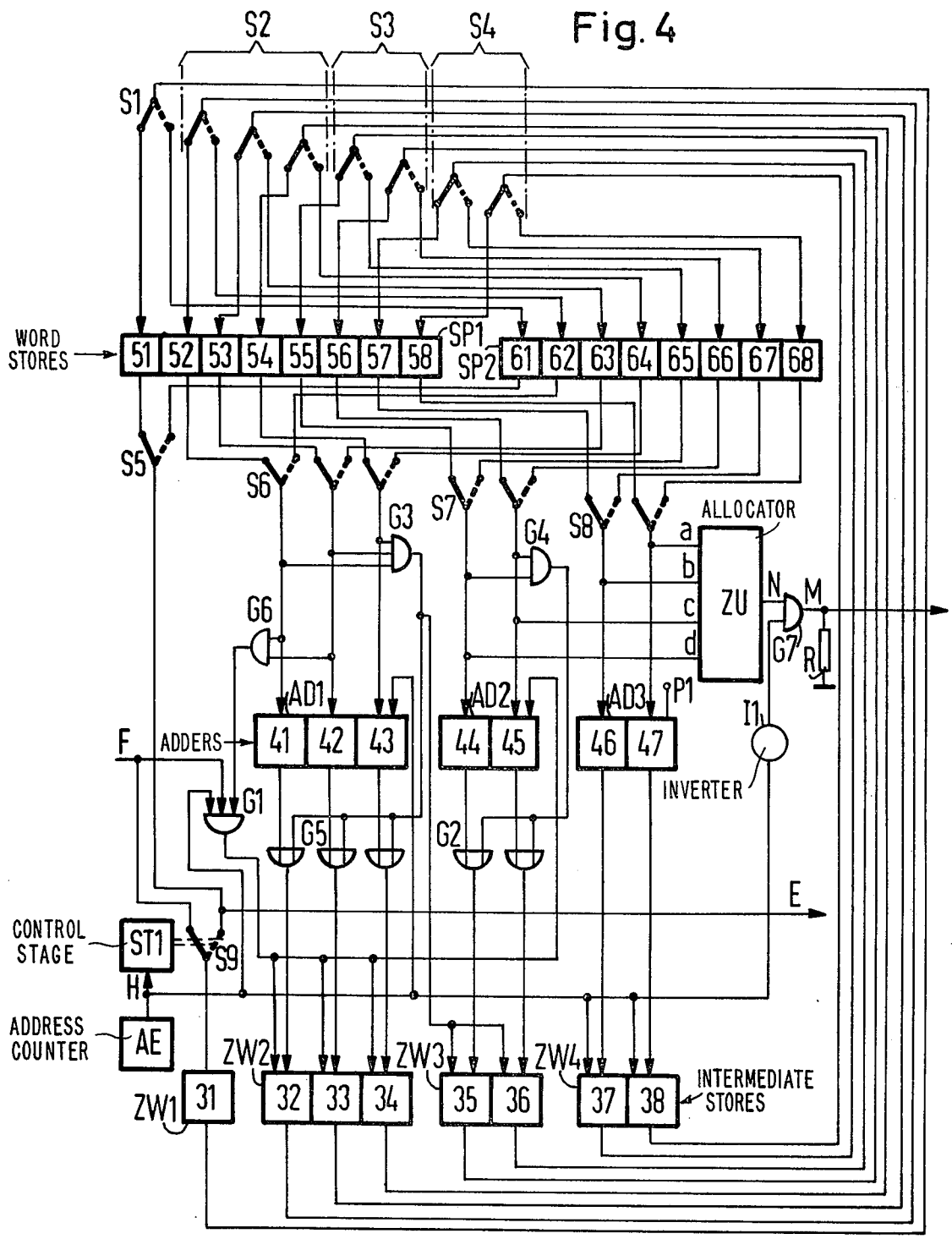
FIG. 4 is a more detailed schematic view of the stop element lengthening device illustrated in FIG. 3, FIGS. 5 and 6 are time-waveform diagrams showing signals which occur during the operation of the stop element lengthening device.
Figure 5:
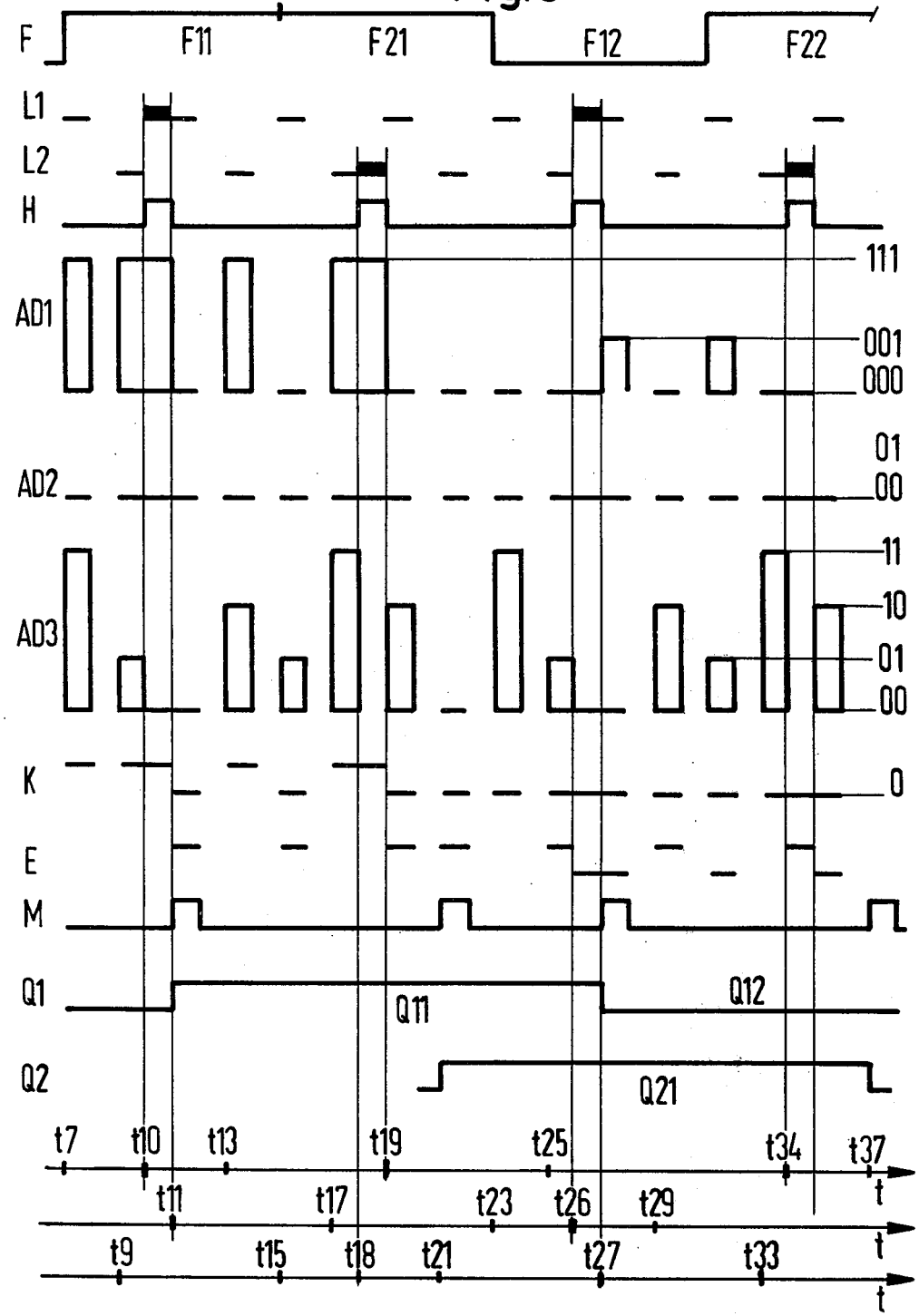
Figure 6:
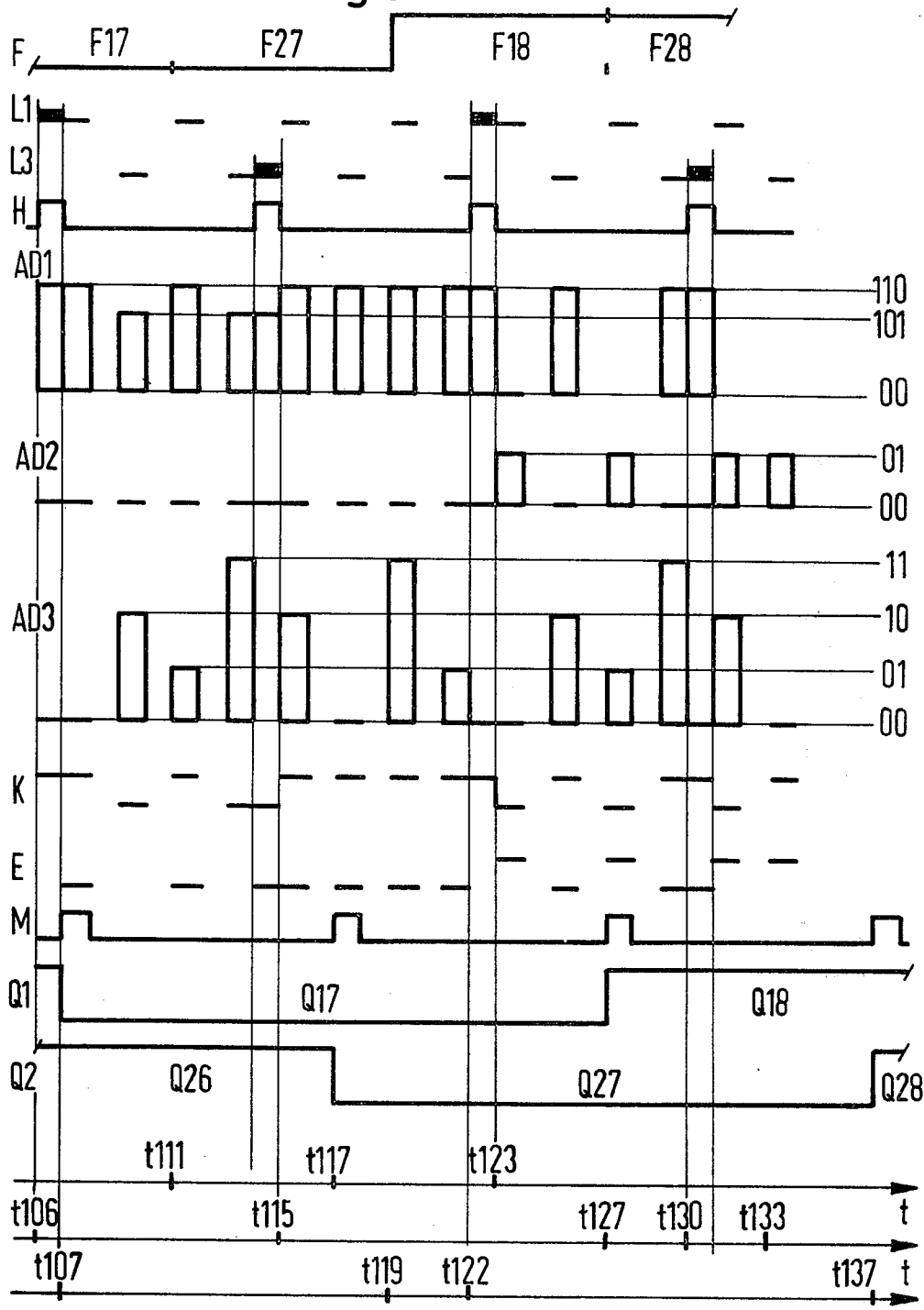
Figure 8:
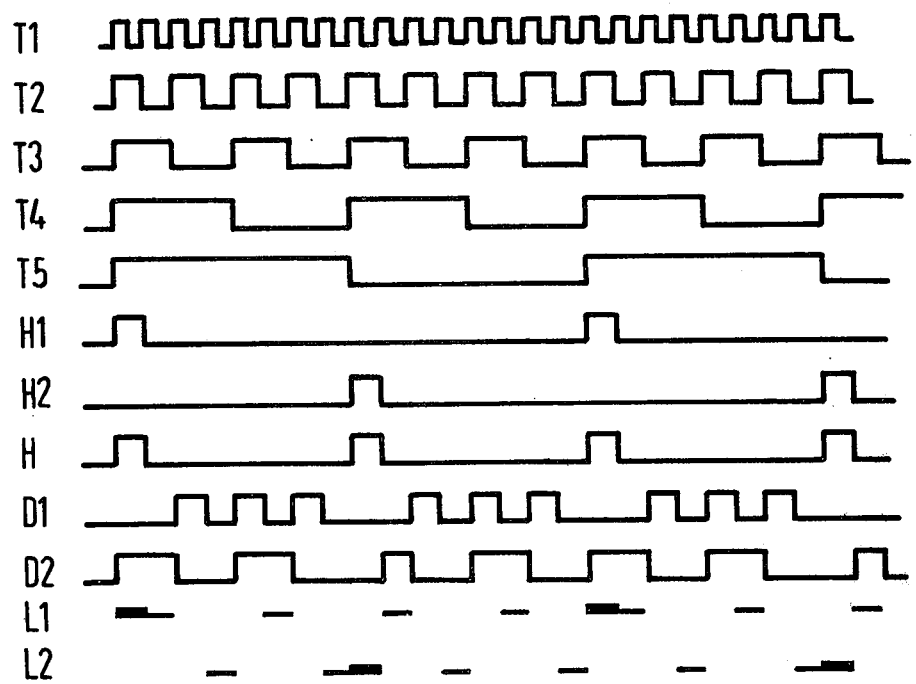
FIG. 8 is a time-waveform diagram illustrating signals which occur during the operation of the address counter illustrated in FIG. 7.

The address counter AE also produces a signal H which is illustrated in FIGS. 5, 6 and 8 and with which the control stage ST1 is controlled in such manner that the switch S9 assumes the solid line switch position with the signal H=1 and assumes the broken line switch position with the signal H=0. In dependence upon the position of the switch S9, either the signal F or the signal emitted via the switch S5 is input into the intermediate store ZW1. An adder AD1 and an intermediate store ZW2, likewise adder AD2 and intermediate store ZW3, likewise adder AD3 and intermediate store ZW4 form counting devices which will be discussed in further detail with reference to FIG. 4. These counting devices are controlled by gates G1, G2, G3, G4, G5, G6. An allocator ZU, gate G7, inverter I1 and resistor R serve to produce a signal M which, as already mentioned, is conducted to the multiplexer ME represented in FIG. 1.

This stop element lengthening device is basically characterized by the fact that the adders AD1 to AD3, the intermediate stores ZW1 to ZW4, the gates G1 to G7, the inverter I1, the resistor R, the control stage ST1 and the switch S9 are all provided only singly, even when a hundred signals Q1 to Qn must be brought into phase. The greater the number of the signals Q1 to Qn which are to be brought into phase, and the number of the corresponding data sinks DS1 to DSn, the greater is the number of the word stores SP1 to SPn and the number of switch postions of the switches S1 to S8, which are in the form of electronic switches, that are used. As large-capacity stores SP are available inexpensively, the word stores SP1 to SPn require lower expense than stores of equal capacity which would have to be arranged decentrally in the region of the channel units ES1 to ESn for purposes of lengthening the stop element.

FIG. 4 is a circuit diagram of a stop element lengthening device SV like that in FIG. 3, but which is shown in more detail than in FIG. 3. To simplify the illustration, this figure relates only to the situation of n=2. The word stores SP1 and SP2 consist of the cells 51 to 58 and 61 to 68, each of which store one bit. The adder AD1 is a binary adder which is formed from the cells 41, 42, 43, and which enables two binary numbers to be added. One of these binary numbers is conducted via the central contacts of the switches S6. The other of the two binary numbers is the numbers 001 which is additional supplied whenever the signal is H=1.

The adders AD2 and AD3 are likewise in the form of binary adders each with two cells 44, 45, and 46, 47, respectively, which are each supplied with a binary number via the central contacts of the switches S7 and S8, respectively. When a 1 signal is emitted via the output of the gate G1, the adder AD2 receives the number 01 as second binary number, whereas the adder AD3 constantly receives the binary number 01 via the circuit point P1.

In the following the mode of operation of the stop element lengthening device will be described making reference to FIGS. 5 and 6. The signal F is illustrated both in FIG. 2 and in FIGS. 5 and 6.

The signal components F11, F12, F13 ... F17, F18 correspond successively to the signal components A11 to A18 of the signal A1, whereas the signal components F21 to F27 correspond in turn to the signal components A21 to A27 of the signal A2. The diagrams L1 and L2 represent the particular addresses one and two, respectively. For example, at the time t7 the address one is set, whereas at the time t9 the address two is set. The addresses one are set up at the equidistant times t7, t11, t15 ... and after four equidistant address settings are set at the times t10, t26 ... Similarly, the addresses two are set at equidistant times t9, t13, t17 and after four equidistant address settings are set at the times t18 and t34. The individual pulses of the signal H coincide alternately with different address settings which are represented by a greater line thickness. In this case the individual pulses of the signal H lie approximately in the center of the signal components F11, F21, F12, F22.

The diagrams AD1, AD2 and AD3 show the counts of the counters which are partially formed by the adder stages AD1, AD2 and AD3, respectively. At the time t7, for example, the count 111 has been set by the adder AD1.

Using the gate G6 illustrated in FIG. 4, a signal K=1 is emitted whenever the word 11 is supplied in the cells 41 and 42.

With the signal H=1 the switch S9 is in the solid line switch position so that signal components of the signal F are input into the cell 31 via the switch S9. Subsequently, the bit stored in the cell 31 is transferred via the switch S1 either into the cell 51 or into the cell 61, in dependence upon whether the address one or two is set. When the address one is set, the switches S1 to S8 are in the solid line switch position, and when the address two is set, the switches S1 to S8 are in the broken line switch position. For example, at the time t10 the switch S9 is in the solid line position so that the signal F=1 is stored in cell 31 and in the solid line position of the switch S1 is transferred into cell 51 where it initially remains stored. At the time t11 the bit stored in cell 51 is emitted via the switch S5 as signal E=1 via the output of the stop element lengthening device. As shown in FIG. 1, the signal E is conducted to the trigger stages ES1, ES2 but is only transferred with the signals M=1, whereas the signal E is not transferred for the duration of the signals M=0. For example, at the time t11 the signal E=1 is transferred into the trigger stage ES1 for the duration of the signal M=1, and forms the leading edge of the signal Q11. At the time t27 the address one is again set up, and the signal E=0 is transferred into the trigger stage ES1 for the duration of the signal M=1 forming the leading edge of the signal Q2. With the signal Q1 and its signal components Q11, Q12, thus the signal components F11, F12 and the corresponding signal components A11, A12 of the signal A1 are indicated. Similarly, at the time t21 the signal E=1 is transferred into the trigger stage ES2 during the duration of the signal M=1, and the leading edge of the signal Q21 is formed. The times at which the signal E are transferred into the trigger stages are thus dependent upon the signals M=1. The signals E which signal the signal components F11 to F16 and F21 to F26 represented in FIG. 2 are transferred into the trigger stages ES1 and ES2 in a similar fashion to that illustrated in FIG. 5 in respect of the signal components F11, F12, F21, F22. In order to produce the lengthened stop elements Q17 and Q27 shown in FIG. 6, the signals M=1 are produced in dependence upon the signal components F17, F18 and F27, F28, and thus, the duration of the stop elements A17 and A27 shown in FIG. 2 is taken into consideration.

The production of the signals M=1 will firstly be described in respect of the address one. Table 1 show the counts which occur on the adders AD1, AD2, AD3 at the beginning of the set addresses. It will be assumed that at the time t7 the word 1110011 is stored in the cells 52 to 58, so that the word 111 appears at the inputs of the adder AD1, the word 00 appears at the inputs of the adders AD2, and the word 11 appears at the inputs of the adder AD3. As the word 11 is present in the cells 41 and 42, the gate G6 emits the signal K=1. The word 111 is present in the cells 41 to 43, and with the signal H=0, the word 111 is emitted via the output of these cells 41 to 43, and is input into the cells 32 to 34. Shortly thereafter, the bits stored in the cells 32 to 34 are transferred via the switches S2 into the cells 52 to 54 where they initially remain stored. The word 00 is present in the cells 44 and 45, and as, on account of the signal H=0 a 0 signal is supplied via the output of the gate G1, the word 00 continues to be emitted via the outputs of the cells 44 and 45 and is input into the cells 35 and 36. The word 11 is present at the inputs of the cells 46 and 47, and as the word 01 is also added via the circuit point P1, the word 00 is input into the cells 37, 38. Shortly after the time t7, thus the word 1110000 is transferred from the cells 32 to 38 into the cells 52 to 58 where it remains stored at least until the time t10.

TABLE 1

| t | AD1 41 | 42 | 43 | AD2 44 | 45 | 46 | AD3 47 | H | K | M |
|---|---|---|---|---|---|---|---|---|---|---|
| t7 | 1 | 1 | 1 | 0 | 0 | 1 | 1 | 0 | 1 | 0 |
| t10 | 1 | 1 | 1 | 0 | 0 | 0 | 0 | 1 | 1 | 0 |
| t11 | 0 | 0 | 0 | 0 | 0 | 0 | 0 | 0 | 0 | 1 |
| t15 | 0 | 0 | 0 | 0 | 0 | 0 | 1 | 0 | 0 | 0 |
| t19 | 0 | 0 | 0 | 0 | 0 | 1 | 0 | 0 | 0 | 0 |
| t23 | 0 | 0 | 0 | 0 | 0 | 1 | 1 | 0 | 0 | 0 |
| t26 | 0 | 0 | 0 | 0 | 0 | 0 | 0 | 1 | 0 | 0 |
| t27 | 0 | 0 | 1 | 0 | 0 | 0 | 0 | 0 | 0 | 1 |
| t42 | 0 | 1 | 0 | 0 | 0 | 0 | 1 | 0 | 0 | 0 |
| t58 | 0 | 1 | 1 | 0 | 0 | 0 | 1 | 0 | 0 | 0 |
| t74 | 1 | 0 | 0 | 0 | 0 | 0 | 1 | 0 | 0 | 0 |
| t90 | 1 | 0 | 1 | 0 | 0 | 0 | 1 | 0 | 0 | 0 |
| t106 | 1 | 1 | 0 | 0 | 0 | 0 | 1 | 0 | 1 | 0 |
| t107 | 1 | 1 | 0 | 0 | 0 | 0 | 0 | 1 | 1 | 1 |
| t122 | 1 | 1 | 0 | 0 | 0 | 0 | 1 | 1 | 0 |
| t123 | 0 | 0 | 0 | 0 | 1 | 0 | 0 | 0 | 0 | 0 |
| t127 | 0 | 0 | 0 | 0 | 1 | 0 | 1 | 0 | 0 | 1 |

At the time t10, the word 11 in the cells 52 to 54 is transferred into the cells 41 to 43. Since, however, with the signals H=1, F=1, a 1 signal is simultaneously emitted from the gate G1, and thus the cells 32 to 34 are reset, the cells 32 to 34 store the word 000 which is subsequently transferred into the cells 52 to 54. With the word 111, the gate G3 emits a 1 signal to the cells 35 and 36 so that the latter store the word 00 and then emit it to the cells 55, 56. With the signal H=1 the cells 37, 38 are reset, so that they store the word 00, and then emit the latter to the cells 57 and 58. Shortly after the time t10 the cells 52 to 58 thus store the word 0000000 which is emitted at the time t11. When the next addresses are called up at the times t15, t19 and t23, the word 01 is added via the circuit point P1 so that at the times t15, t19, t23, t26 the words 01, 10, 11 and 00, respectively, occur on the adder AD3. The adder AD3 is thus constantly caused to count upwards after the signals H=1, which is also clearly shown in FIGS. 5 and 6.

The adder AD2 is caused to count up only when it receives a 1 signal via the gate G1, which is not the case until the time t122, as it is only then that the signals H=1, F=1 and K=1 occur. Shortly after the time t122, the word 00 is input into the cells 37, 38 and 57, 58 so that it is available at the time $t123$.

The adder AD3 is caused to count upwards with the signals H=1, and as these signals occur approximately in the middle of the signal components F11 to F17, the signal components corresponding to the individual bits of the signal A1 are counted off. At the times $t10$, $t26$, $t42$, $t58$, $t74$, $t90$, $t106$, the adder AD1 is caused to count upwards and reaches the counts 111, 000, 001, 010, 011, 100, 101, 110, respectively.

The allocator ZU has inputs $a$, $b$, $c$, $d$, and via its output emits the signal N=1 when the words present at the inputs $a$ and $b$ and at the inputs $c$ and $d$ are identical. Otherwise the signal N=0 is emitted, as also shown in Table 2. The gate G7 only allows the signal N through when, with the signal H=0 a 1 signal is set up at the output of the inverter 11. In this way the signal M is produced. The resistor R causes the signal M=0 to be emitted even when no signals are present at the inputs $a$, $b$, $c$, $d$ of the allocator ZU. At the time $t123$, the signal M=1 should occur when the stop element Q17 would have the same length as the other bits Q11 to Q16.

Since the adder AD2 constantly registers the count 00 during the duration of the bits Q11 to Q16, and the counter AD3 likewise registers the count 00 during the duration of the pulses H=1, the signals M=1 are in each case produced shortly after the occurrence of the signals H=1, and thus, the edges of the pulses Q1, Q2 . . . Q16 are established. For example, at the time $t26$, the counts of the adders AD2 and AD3 are both equal to 00, so that in accordance with Table 2 the signal N=1 is emitted, and at the time $t27$, the signal M=1 is produced which establishes the leading edge of the bit Q12. In the case of the stop element Q17 the conditions differ, however, inasmuch as at the time $t123$, with the signals H=1, F=1, K=1 via the output of the gate G1 a 1 signal is emitted which produces the count 01 on the adder AD2 at the time $t123$. Thus, at the time $t123$, the signal M=1 cannot be produced because the counts of the two adders AD2 and AD3 are not identical. Not until the time $t127$ are the counts of the two adders AD2, AD3 equal to 01 and with the signal H=0 the signal M=1 is produced, producing the delayed trailing edge of the stop element Q17. When, with the signal component F18, which represents the start element of the new character, it is signalled that the stop element A17 shown in FIG. 2 has the same length as the other bits A11 to A16, the lengthened stop element Q17 is produced.

If the signal component F18 does not signal a 1 value, as shown in FIG. 6, but signals a 0 value, this means that the stop bit A17 is longer than shown in FIG. 2. The lengthened stop bit A17 is thus signalled by 0 values of the two signal components F17 and F18. In this case at the time $t122$, with the signal H=1, the counter AD1 reaches the count 111, so that the cells 35, 36 and 55, 56 are reset to 00 and at the time $t123$ the signal M=1 is produced. With the next stop element to occur, again a signal is produced which has the same length as the bit Q17 and the other bits Q11 to Q16. If, thus a long stop element A17 occurs, two or more stop elements are produced, all of which have the same length as the bits Q11 to Q17.

TABLE 2

| a | b | c | d | N |
|---|---|---|---|---|
| 0 | 0 | 0 | 0 | 1 |

TABLE 2-continued

| a | b | c | d | N |
|---|---|---|---|---|
| 0 | 0 | 0 | 1 | 0 |
| 0 | 0 | 1 | 0 | 0 |
| 0 | 0 | 1 | 1 | 0 |
| 0 | 1 | 0 | 0 | 0 |
| 0 | 1 | 0 | 1 | 1 |
| 0 | 1 | 1 | 0 | 0 |
| 0 | 1 | 1 | 1 | 0 |
| 1 | 0 | 0 | 0 | 0 |
| 1 | 0 | 0 | 1 | 0 |
| 1 | 0 | 1 | 0 | 1 |
| 1 | 0 | 1 | 1 | 0 |
| 1 | 1 | 0 | 0 | 0 |
| 1 | 1 | 0 | 1 | 0 |
| 1 | 1 | 1 | 0 | 0 |
| 1 | 1 | 1 | 1 | 1 |

When the word 111 is signalled with the gate G3, and a 1 signal is emitted via the output of said gate, the word 111 remains in the cells 32 to 34 even when the cells 41 to 43 have been set 000 with the signal H=1. Only when F=1, H=1 and K=1 (new start element) are the cells 32 to 34 set to 000.

When the word 11 is supplied to the gate G4, a 1 signal is emitted from the output of this gate, and the word 11 is retained in the cells 35, 36 even when the cells 44, 45 are set to zero with the output signal of the gate G1.

In the aforegoing, processes have been described which occur when a one address is set. If the address two is set and thus the switches S1 and S8 represented in FIG. 4 assume the broken line switch positions, the counters with the adders AD1, AD2, AD3 are caused to count upwards as shown in Table 3 and FIGS. 5 and 6 in a similar fashion as in the case of the address one. When the stop element A27 illustrated in FIG. 2 possesses approximately the same length as the other bits A21 to A26, the signal M=1 is not produced until the time $t137$, and thus the lengthened stop element Q27 is produced, as in the case of the lengthened stop element Q17.

TABLE 3

| t | 41 | 42 | 43 | 44 | 45 | 46 | 47 | H | K | M |
|---|----|----|----|----|----|----|----|---|---|---|
| t17 | 1 | 1 | 1 | 0 | 0 | 1 | 1 | 0 | 1 | 0 |
| t18 | 1 | 1 | 1 | 0 | 0 | 0 | 0 | 1 | 1 | 0 |
| t21 | 0 | 0 | 0 | 0 | 0 | 0 | 0 | 0 | 0 | 1 |
| t25 | 0 | 0 | 0 | 0 | 0 | 0 | 1 | 0 | 0 | 0 |
| t29 | 0 | 0 | 0 | 0 | 0 | 1 | 0 | 0 | 0 | 0 |
| t33 | 0 | 0 | 0 | 0 | 0 | 1 | 1 | 0 | 0 | 0 |
| t34 | 0 | 0 | 0 | 0 | 0 | 0 | 1 | 0 | 0 | 0 |
| t37 | 0 | 0 | 1 | 0 | 0 | 0 | 0 | 0 | 0 | 1 |
| t53 | 0 | 1 | 0 | 0 | 0 | 0 | 1 | 0 | 0 | 0 |
| t69 | 0 | 1 | 1 | 0 | 0 | 0 | 1 | 0 | 0 | 0 |
| t85 | 1 | 0 | 0 | 0 | 0 | 0 | 1 | 0 | 0 | 0 |
| t101 | 1 | 0 | 1 | 0 | 0 | 0 | 1 | 0 | 0 | 0 |
| t117 | 1 | 1 | 0 | 0 | 0 | 0 | 0 | 0 | 1 | 1 |
| t130 | 1 | 1 | 0 | 0 | 0 | 0 | 1 | 1 | 1 | 0 |
| t133 | 0 | 0 | 0 | 0 | 1 | 0 | 0 | 0 | 0 | 0 |
| t137 | 0 | 0 | 0 | 0 | 1 | 0 | 1 | 0 | 0 | 1 |

Figure 7:
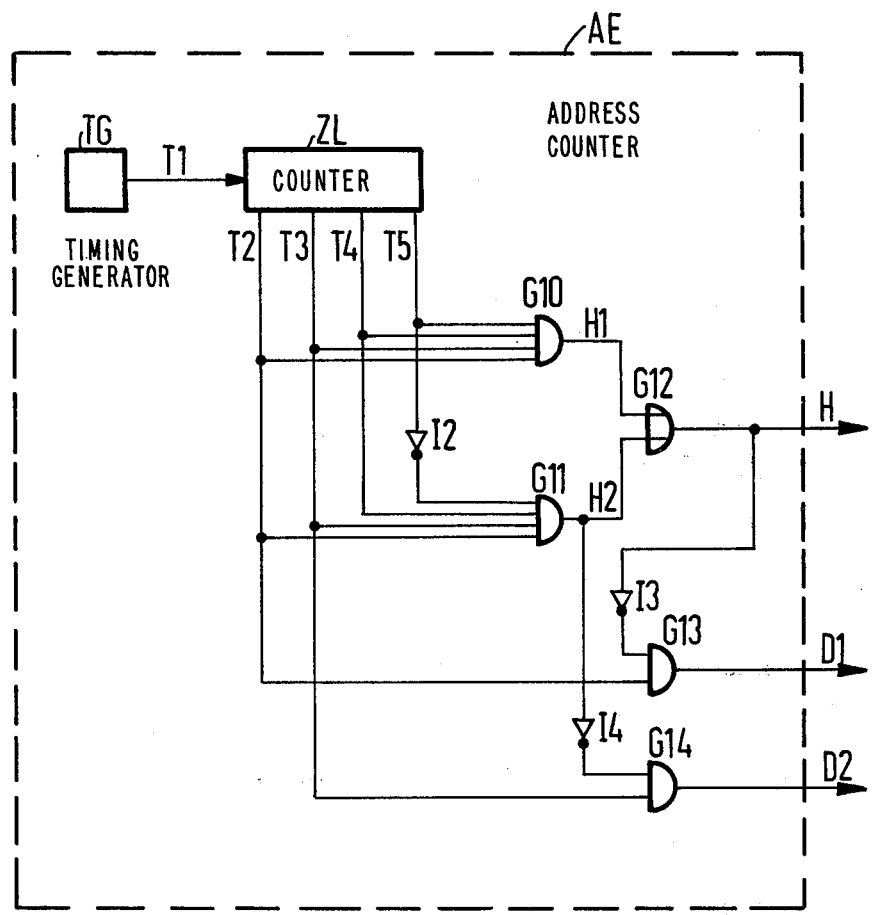
FIG. 7 is a schematic diagram of an address counter as used in the FIG. 1 embodiment.

FIG. 7 shows an exemplary embodiment of the address counter AE schematically illustrated in FIGS. 1, 3 and 4. To simplify the drawing, this address counter is shown only to relate to the situation of $n=2$. FIG. 8 shows a few signals produced with the address counter. The pulse generator TG emits the signal T1 to the counter ZL which emits the signals T2, T3, T4 and T5 via its outputs. From these signals, firstly, the signals H1, H2 are obtained with the aid of the gates G10, G11 and the inverter I2, and then, using the gate G12 the signal H is obtained whose phase state is established in such manner that the individual pulses, as already mentioned, occur approximately in the center of the signal components F11 to F18 and F21 to F28. Using the inverters I3, I4 and the gates G13, G14, the address signals D1, D2 are obtained. With the signals D1=0 and D2=1, the address one is signalled, and with the signals D1=0 and D2=0 the address two is signalled. The diagrams L1 and L2 also shown in FIGS. 5 and 6 illustrate the times at which the addresses one and two are each set.

Figure 9:
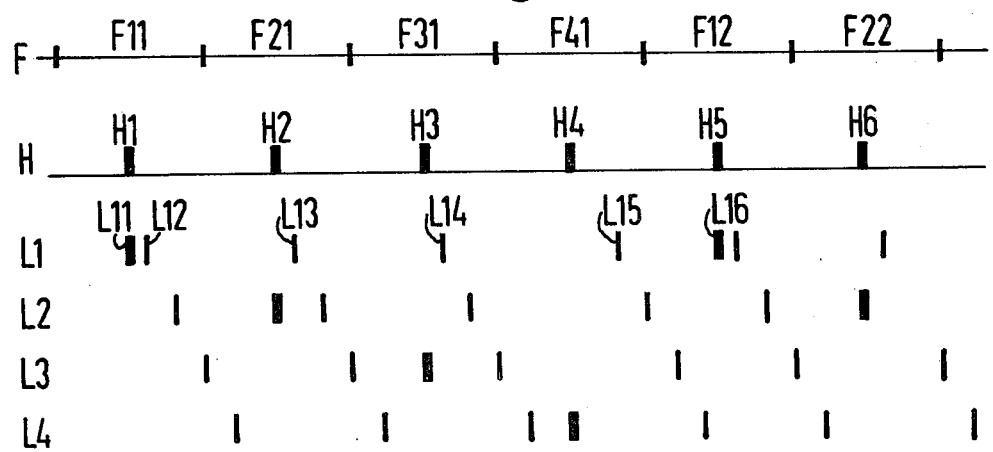
FIG. 9 is a diagram showing the setting of the addresses.

FIG. 9 shows signals and diagrams which occur in the case of $n=4$. Thus, four data sources and four corresponding data signals will be assumed to be provided, and in each case one bit of these data signals is signalled with the signal components F11, F21, F31, F41 of the signal F. The signal components F12, F22 each correspond to a second bit of the data signals. The signal H is again produced in such manner that its pulses occur approximately in the center of the signal components F11, F21, F31, F41 ... The diagrams L1, L2, L3, L4, show the settings of the addresses one, two, three, four. In this exemplary embodiment a total of four different types are provided corresponding to the diagrams L1, L2, L3, L4. In each case one thick-line address is emitted simultaneously with the pulses H1, H2, H3, H4, H5. A total of $m=4$ similar address occur between two thick-line addresses of the same type. For example, between the thick-line addresses L11 and L16 of the "one" type there occur four addresses L12, L13, L14, L15 of the "one" type. Thus the number $m$ is to be equal to at least 4, in order to cause the adder AD3 to count up the count of 11. Generally speaking it is not necessary for the number to be greater than 8 even when a hundred data sinks are to be provided.

The principles of the invention are described hereinabove by describing an exemplary and preferred embodiment constructed accordingly. The described embodiment can be modified or changed in a number of ways known to those skilled in the art while remaining within the scope of the invention as defined by the appended claims.

We claim:

1. In a character frame governed time division multiplex (t.d.m.) data transmission system wherein a t.d.m. signal is transmitted via a transmission link to a receiver multiplexer having outputs connected, respectively, to channel units, the outputs of said channel units being connected, respectively, to data sinks, the improvement comprising:

a stop element lengthening apparatus centrally interposed in the received t.d.m. signal path between said transmission link and said receiver multiplexer for producing a timing signal and sequentially coupling said timing signal to said channel units, and for coupling information portions of the data signals to said channel units, the channel units, respectively, being triggered by said timing signal, the stop element lengthening apparatus comprising:

means for generating a sequence of sampling pulses occurring substantially in the centers of the signal components of the received t.d.m. data signals, each said sampling pulse corresponding to a respective signal component, first counter means connected to receive said sampling pulses as counting pulses, gate means for emitting a blocking signal when, during the duration of said sampling pulses, a start element of the data signal is indicated and a predetermined count is reached or exceeded by said first counter means, second counter means connected to receive said blocking signal as a counting signal and including resetting means operable responsive to the exceeding of said predetermined count, third counter means connected to receive said sampling pulses as counting pulses and means for producing said timing signal when said second and third counter means register equal counts.

2. The improved data transmission system defined in claim 1 wherein said stop element lengthening apparatus further comprises:

a number of word stores equal to the number of said channel units, each said channel unit being assigned a word store, each said word store having a plurality of cells with an input to and an output from each cell, first address-controlled switch means connecting the outputs of said cells, resepectively, to said first, second and third counter means, second address-controlled switch means connecting outputs of said first, second and third counter means to inputs of said cells.

3. The improved data transmission system defined in claim 2 wherein said stop element lengthening means further comprises:

first adder means and a first intermediate store constituting said first counter means, second adder means and a second intermediate store constituting said second counter means, third adder means and a third intermediate store constituting said third counter means, inputs of said first, second and third adder means being connected by said first switch means the outputs of said cells, outputs of said first, second and third intermediate stores being connected by said second address-controlled switch means, respectively, to cell inputs of said word stores.

4. The improved data transmission system defined in claim 1 further comprising:

address counter means for emitting a number $n$ different types of addresses in a number equalling the number of channel units, one address being emitted concurrently with each said sampling pulse and between two consecutive addresses of the same type four further addresses of the same type being emitted.

* * * * *